No. 686,790. Patented Nov. 19, 1901.
A. T. WENTWORTH.
DRAFT CONNECTION.
(Application filed Apr. 15, 1901.)
(No Model.)
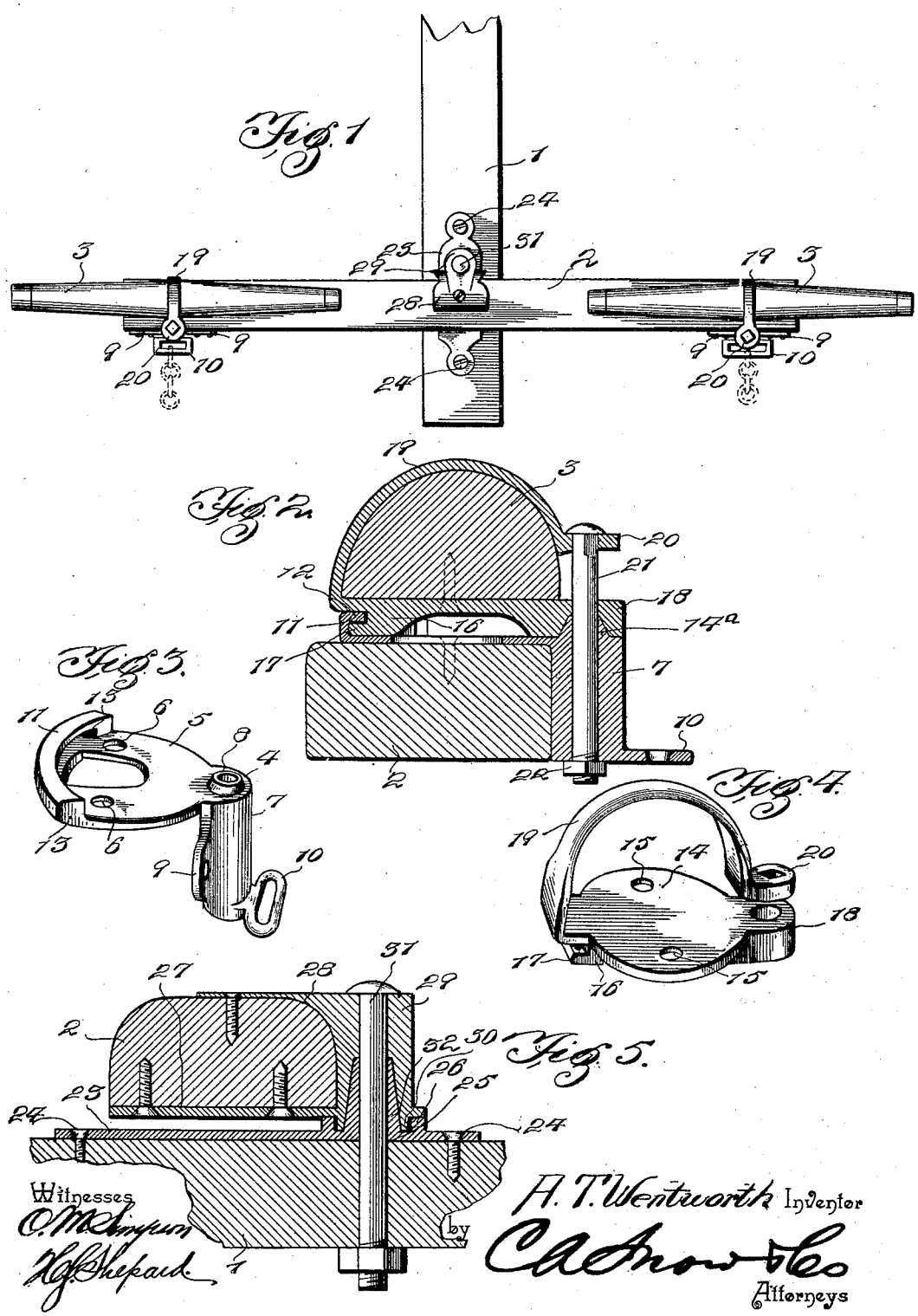

UNITED STATES PATENT OFFICE.

ADDISON T. WENTWORTH, OF BEDFORD, IOWA, ASSIGNOR OF TWO-FIFTHS TO FRANKLIN L. ARTHAUD, OF BEDFORD, IOWA.

DRAFT CONNECTION.

SPECIFICATION forming part of Letters Patent No. 686,790, dated November 19, 1901.

Application filed April 15, 1901. Serial No. 55,978. (No model.)

*To all whom it may concern:*

Be it known that I, ADDISON T. WENTWORTH, a citizen of the United States, residing at Bedford, in the county of Taylor and State of Iowa, have invented a new and useful Draft Connection, of which the following is a specification.

This invention relates to draft connections, and has for its object to provide improvements in such devices which are particularly adapted for use in connection with whiffletrees and to obviate the formation of openings through the part to which the device is applied. It is furthermore designed to facilitate the application and removal of the device and also to insure a strong and durable connection with the parts to which the device is applied.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a plan view showing the present invention employed to connect a doubletree to a tongue and a pair of whiffletrees to the opposite ends of a doubletree. Fig. 2 is an enlarged detail sectional view taken on the line 2 2 of Fig. 1. Fig. 3 is a detail perspective view of the fixed or base member of the device. Fig. 4 is a detail perspective view of the pivotal or movable member. Fig. 5 is an enlarged detail sectional view taken on the line 5 5 of Fig. 1.

Like characters of reference designate corresponding parts in all of the figures of the drawings.

In Fig. 1 of the drawings there has been shown the rear end portion of a tongue or draft-pole 1, across which extends a doubletree 2, that is pivotally connected to the tongue by one of the forms of the present invention and carries at its opposite ends the ordinary whiffletrees 3, pivotally mounted upon the doubletree by means of another form of the present device.

The whiffletree connection has been shown in detail in Figs. 2 to 4, inclusive, and comprises an angular bracket member 4, having a flat plate-section 5 to lie upon the top of the doubletree and provided with a plurality of perforations 6 for the reception of fastenings to be set downwardly into the doubletree. The pendent section 7 is tubular and opens upwardly through the outer or rear end portion of the plate, with its upper open end surrounded by a beveled upstanding marginal rim or boss 8. Suitable perforate attaching ears or flanges 9 project in opposite directions from the tubular portion 7 and are designed to be secured against the rear side of the doubletree. At the lower end of the part 7 there is provided a loop or eye 10 for connection with a chain, leather strap, or other flexible connection between the eye and a part of the running-gear of a vehicle, as indicated in Fig. 1. The front or outer edge of the plate 5 is struck upon an arc from the tubular part 7 as a center and is provided with an upstanding marginal flange 11, that is grooved upon its inner side, with the lower edge of the groove flush with the upper face of the plate, thereby forming an overhanging flange 12. (Best indicated in Fig. 2.) The groove terminates short of the opposite ends of the flange, so as to form opposite terminal stop-shoulders 13.

Upon the fixed bracket member there is mounted a movable member consisting of a plate 14 for application to the under side of a whiffletree and provided with perforations 15 for the reception of fastenings. The forward portion of the member is thickened downwardly, as at 16, and the outer front edge thereof is grooved, so as to form a downwardly-offset projection or tongue 17, that is designed to slidably take into the grooved flange of the bracket member. Opposite the part 16 there is provided an outwardly-directed downwardly-thickened perforate bearing-ear 18, the lower end of the opening thereof being countersunk or beveled to receive the beveled boss or flange 14ª of the bracket.

Rising from the outer edge of the plate and opposite the ear is a rearwardly-bowed strap or clip 19, designed to embrace the whiffletree, the rear terminal of the clip terminating above the plate 14 and provided with a substantially horizontal ear 20, having a polygonal opening alined with the opening in the perforate ear 18, so as to receive a bolt 21, that is passed downwardly through the ear 20, the ear 18, and the tubular part 7 of the bracket, there being a nut 22 applied to the lower projected end of the bolt, whereby the two members are connected and the upper member is mounted to swing upon the bolt as a center, the swing of said member being limited in opposite directions by contact of the tongue 17 with the stop-shoulders 13.

To pivotally mount the doubletree to the tongue, there is provided an attaching-plate 23, (best shown in Fig. 5,) which is secured to the upper side of the tongue by means of suitable fastenings 24 and is also provided with a bolt-opening 25 adjacent to one end thereof, said opening being surrounded by an upstanding circular flange 26, that is spaced from the opening. Upon this attaching plate or member there is mounted the movable member, consisting of a plate 27, to fit against the under side of the doubletree and provided with perforations for the reception of fastenings. Rising from one end of the plate 27 is a bowed strap or clip 28, that overhangs the plate and is designed to embrace the doubletree, to which it is connected by one or more fastenings. That end portion of the clip which connects with the plate is provided with an external tubular rib or thickened portion 29, the opening therein extending through the plate and corresponding to the bolt-opening in the attaching member 23, there being a marginal shoulder or collar 30 surrounding the lower end of the opening and upon the inner or under side of the plate 27 to fit within the flange 26. A pivot-bolt 31 is passed downwardly through the tubular portion 29 and the bolt-opening of the tongue, whereby the members are connected and the upper member is pivotally mounted. As indicated in Fig. 1, it will be seen that the bolt lies in front of the doubletree and takes the strain.

From the foregoing description it will be apparent that the part to which the movable member of each form may be applied is not weakened by the formation of bolt-openings therethrough, and the strain of the movable part is applied directly to the pivot-bolt, which lies at one side or the other of the movable draw-bar. Moreover, the pivot-bolt for connecting the members also passes through one end of the draw-bar-embracing clip, so as to lie at one side of the draw-bar. It is also designed to have the plate 23 provided with an upstanding tubular conical boss 32, surrounding the bolt-opening therein and to fit within a corresponding socket at the lower end of the tubular enlargement 29, so as to form a strong and durable pivotal connection between the plate and the clip.

What is claimed is—

1. A draft connection, comprising a fixed attaching-bracket, having a terminal bolt-opening, a pivotal member mounted upon the bracket and having a bolt-opening corresponding to that of the bracket, a draw-bar-embracing clip lying above the pivotal member and having a terminal bolt-opening corresponding to the other bolt-openings, and a pivot-bolt passed through the several bolt-openings and pivotally mounting the upper member upon the lower fixed member.

2. A draft connection, comprising an attaching member, a pivotal member mounted thereon, and having a draw-bar-embracing strap or clip bowed across the same and rising from a point opposite the pivotal connection, the opposite end of the clip being terminated above the pivotal member, and the pivotal connection passing downwardly through said outer end of the clip, the base of the pivotal member and the attaching member.

3. A draft connection, comprising an attaching member having a terminal bolt-opening, a pivotal member mounted thereon and having a terminal bolt-opening corresponding to the bolt-opening of the attaching member, a draw-bar-embracing strap or clip carried by the pivotal member, rising from a point opposite the bolt-opening, and having its outer free end terminated above the member and over the corresponding bolt-openings, and a pivot-bolt passed through the free end of the clip and the bolt-openings, said bolt also forming an adjustable fastening for the clip.

4. A draft connection, comprising an angular attaching-bracket, the vertical member thereof being tubular and having opposite attaching-ears, a pivotal member having a terminal opening corresponding to the upper end of the tubular portion of the bracket, an upwardly and rearwardly bowed strap or clip rising from a point opposite the opening and terminating in a perforate ear located in line with and above the opening, and a pivot and clip adjusting bolt passed through the perforate ear, the opening and the tubular part of the bracket.

5. A draft connection, comprising an angular attaching-bracket, the vertical part of which is tubular, and has opposite attaching-ears, and a rearwardly-directed loop or eye, the horizontal plate-like part having an arcuate upstanding flange struck from the tubular part as a center, and provided in its inner side with a groove, which terminates at opposite ends in stop-shoulders, a pivotal member having a rear terminal bearing perforate ear fitting the upper end of the tubular part, an opposite projection slidably received within the groove of the arcuate flange, a bowed strap or clip rising from a point opposite the ear, with its opposite end terminated in a perforate ear alined above the other ear, and a pivot-bolt passed through the two ears and the tubular part.

In testimony that I claim the foregoing as my own I have hereto affixed my signature in the presence of two witnesses.

ADDISON T. WENTWORTH.

Witnesses:
F. L. ARTHAUD,
J. E. CANON.